Figures 1, 2:
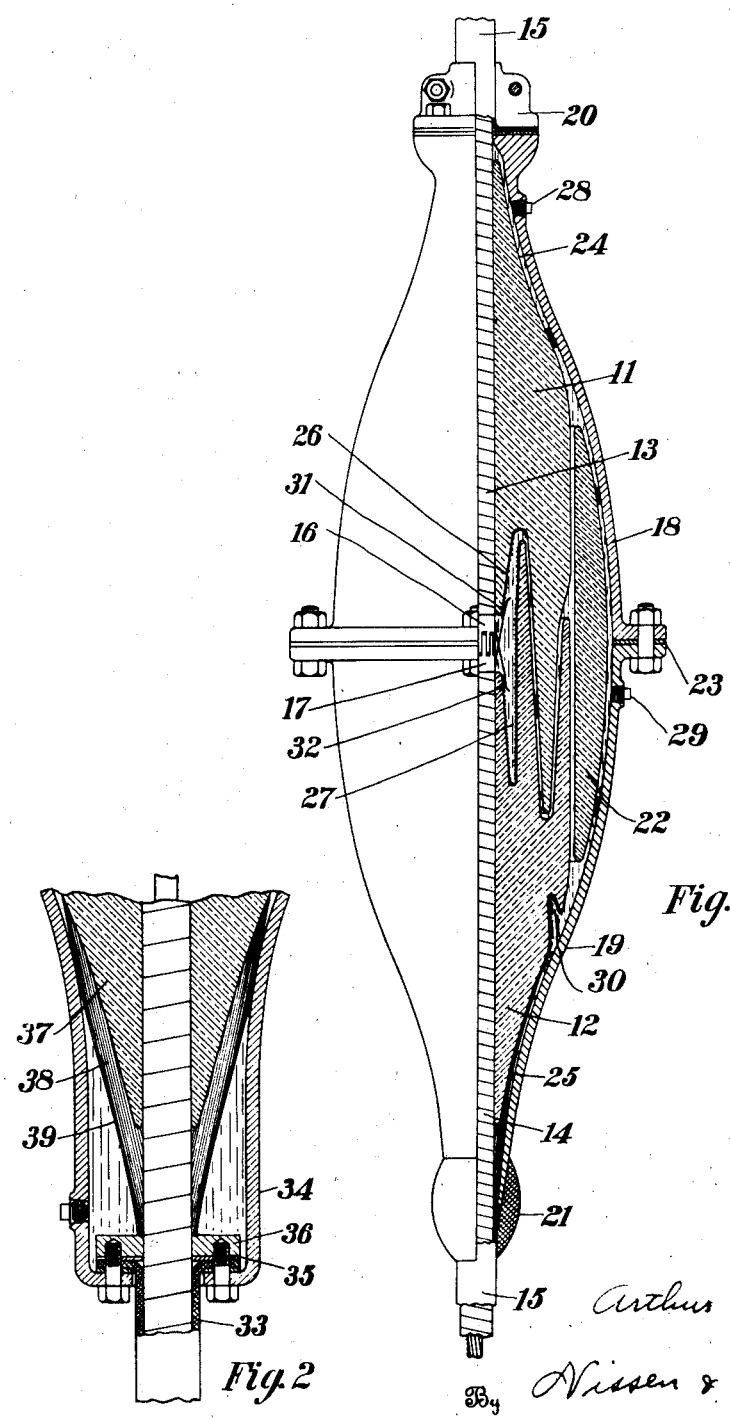

Aug. 26, 1930.    A. O. AUSTIN    1,773,715
JOINT FOR CABLES
Filed Aug. 5, 1926

Inventor
Arthur O. Austin
By Nissen & Crane
Attorneys

Patented Aug. 26, 1930

1,773,715

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

JOINT FOR CABLES

Application filed August 5, 1926. Serial No. 127,438.

This invention relates to a joint for connecting high potential conductor cables and has for one of its objects the provision of a connection for such cables which may be conveniently installed and which will have a high degree of efficiency when in place so that the efficiency of the cable will not be lessened by the presence of the joint therein.

Other objects and advantages will appear from the following description.

The invention is exemplified in the combination and arrangement of parts shown in the accompanying drawing and described in the following specification, and it is more particularly pointed out in the appended claims.

In the drawing—

Fig. 1 is part elevation and part section showing one embodiment of the present invention; and Fig. 2 is a fragmentary section showing a modified form of a portion of the invention.

High voltage cables, particularly those made up with a conductor covered with layers of varnished cambric or paper and impregnated with an oil or insulating compound, have reached a high degree of perfection. These cables, however, have to be made up in rather short lengths so that many joints or splices are required. These joints or splices are not only difficult to make, but, in general, are weaker than the remaining portion of the cable. In order to obviate this difficulty I have devised a new and improved type of joint which is readily installed and which eliminates much of the difficulty heretofore encountered in making up a proper joint.

The joint consists essentially of two complementary meshing dielectric members 11 and 12 which may be placed over the insulated ends 13 and 14 from which the lead sheath has been removed. Complementary connectors 16 and 17 are placed on the ends of the conductors which have sufficient current carrying capacity. The bells 18 and 19 may then be attached to the lead sheath by means of a flange coupling 20 or a wiped joint 21. The dielectric members 11 and 12 are slipped over the respective ends of the cable and the reinforcing dielectric member 22 is slipped between one of the dielectric members and one of the bells. The two parts are then shoved together, the two ends having previously been measured so that when the flanged joint 23 is tightened up, the complementary members 16 and 17 will engage.

The joint consists of insulating members having surfaces 24 and 25 which extend gradually away from the insulated surface of the cable. The surfaces have a conducting layer such as a bell 18 near the surface or the surfaces may be metallized as in 25. Discharge along the inner surface and through the joint between members 11 and 12 is prevented by metallized control pockets and surfaces 26 and 27. These surfaces take up the charging current which tends to flow along the joint between the insulated layer and the insulating members and also along the joint between complementary members 11 and 12. Where it is not convenient to make the complementary insulating members sufficiently large to give the necessary leakage surface along the joint, this may be further reinforced by an insulating sleeve or member 22 which further increases the length of the joint and adds dielectric strength in a radial direction.

After the joint is completed, the intervening space may be filled with insulating oil or compound which may come out between the complementary members 16 and 17 where a hollow cable is used, or which may be forced in through the filling plugs 28 and 29. Where the ends 25 are metallized and insulated control pockets 30 are used, the shields 18 and 19 may be left off and the two parts used for making up the joint in air. In this case any space between the insulated cable and the members 11 and 12 must be filled with a hard insulating compound. Electrical contact between insulated control pockets or surfaces 26 and 27 may be made by springs 31 and 32 or other suitable means.

Fig. 2 shows a form somewhat different from that shown in Fig. 1 for attaching the metallic bell or cover to the cable sheath. The lead sheath 33 is flared outward after the metallic shell 34 has been slipped back over the cable. A gasket 35 and a clamping ring 36 are then slipped over the cable and placed in approximate position. The insulating member 37 is then placed in proper position and any intervening space covered by a layer of wrapped insulation 38. This surface is then covered by a layer of foil 39. The bell 34 is then drawn into position and the flanged sheath 33 clamped securely between it and the ring 36, the gasket 35 facilitating the operation. In general, it is desirable to avoid the necessity of using wrapped insulation 38 as this material usually has a lower specific inductive capacity than the solid dielectric members 37. This tends to make it more difficult to prevent charging current flowing along the surface. Where the conductor covering, however, is of a different size from the member 37, the method may be advantageous.

I claim:—

1. The combination with a conductor having a joint therein, of a pair of dielectric sleeves surrounding said conductor at the opposite sides of said joint, said sleeves having interfitting projections overlapping said joint.

2. The combination with a conductor having a joint therein, of dielectric sleeves surrounding said conductor at the opposite sides of said joint, said sleeves having overlapping flanges thereon surrounding said joint.

3. The combination with a conductor having a joint therein, of dielectric sleeves surrounding said conductor at opposite sides of said joint, said sleeves having overlapping flanges surrounding said joint and providing pockets in said sleeves at opposite sides of said joint, and a conductor disposed in said pockets forming flux control members to minimize electrical discharge through the spaces between said overlapping flanges.

4. The combination with a pair of conductors having complementary connecting members on the ends thereof arranged to form electrical contact between said conductors when said conductors are moved together endwise, of dielectric sleeves surrounding the ends of said conductors and having complementary flanges thereon arranged to move into interfitting relation with one another to overlap the joint formed by said conductors when said sleeves are moved together longitudinally of said conductors.

5. The combination with a pair of conductors having complementary connecting members on the ends thereof arranged to form a joint between said conductors when said conductors are moved together endwise, of a pair of sleeves surrounding the ends of said conductors and having complementary flanges arranged to interengage one another when said sleeves are moved together endwise, and means for holding said complementary connectors and sleeves in interfitting relation with each other respectively.

6. The combination with a pair of conductors having contact members on the ends thereof for joining said conductors when said conductors are moved together endwise, of dielectric sleeves surrounding the ends of said conductors and having flanges thereon movable into overlapping relation when said sleeves are moved together endwise, and a supplementary sleeve surrounding said overlapping flanges.

7. The combination with conductors having connector members at the ends thereof forming a joint between said conductors, of dielectric sleeves surrounding said conductors and having interfitting flanges projecting into overlapping relation around the joint between the ends of said conductors, a supplementary sleeve surrounding said overlapping flanges, and a housing member enclosing said sleeves and holding said sleeves and conductors in assembled relation.

8. In combination, a pair of cables each comprising a conductor, an insulating covering surrounding said conductor and a metallic sheath, contact members secured to the ends of said conductors and operating to form a joint between said conductors when said contact members are moved together endwise, said metallic sheaths being spaced from said contact members to expose portions of said insulating covering, and dielectric sleeves surrounding the exposed portions of said insulating covering and having flanges overlapping one another and surrounding the joint formed by said contact members.

9. The combination with a pair of cables each comprising a conductor, an insulating covering surrounding said conductor, and a metallic sheath, of contact members secured to the ends of said conductors and arranged to form a joint for said conductors when moved together endwise, said sheaths being spaced from said contact members to expose portions of said insulating covering, dielectric sleeves surrounding the exposed portions of said insulating covering, the adjacent ends of said sleeves being provided with overlapping flanges for surrounding said joint when said sleeves are moved together, the outer ends of said sleeves being tapered and disposed adjacent the ends of said sheaths, and a metallic covering secured to the ends of said sheaths and enclosing said sleeves.

10. The combination with a pair of cables each comprising a conductor, a dielectric covering and an outer metal sheath, of means for connecting the ends of said conductors, the ends of said sheaths being spaced from the ends of said conductors to expose portions of said insulating covering, dielectric sleeves surrounding the exposed portions of said insulating covering and having overlapping baffles at the adjacent ends thereof, the opposite ends of said sleeves being tapered, and a metallic housing having tapered ends secured to the ends of said sheaths, said housing being divided between the ends thereof, and means for securing the portions of said housing together to hold said sleeves and connecting members in assembled relation.

11. The combination with a pair of cables having conductors, insulating coverings for said conductors and outer metal sheaths, of means for forming a joint between the ends of said conductors, the ends of said sheaths being spaced outwardly from said joint, dielectric sleeves surrounding the portion of said cables between the ends of said sheaths and said joint, said sleeves having overlapping flanges on the inner ends thereof, said flanges being spaced apart to provide pockets in the ends of said sleeves, conductor members within said pockets electrically connected with said joint to form flux controls for preventing electrical discharge through the space between said overlapping flanges, and means for holding said conductors and sleeves together.

12. The combination with a pair of cables each having a conductor, an insulating covering and an outer metal sheath, of means for forming a joint between adjacent ends of said conductors, the ends of said sheaths being spaced from said joint, dielectric sleeves surrounding said conductors between the ends of said sleeves and said joint, the adjacent ends of said sleeves having overlapping flanges to provide an elongated leakage path between said sleeves and joint, and insulated flux control members adjacent the ends of said leakage path.

13. The combination with a pair of cables each having a conductor, a dielectric covering and an outer metal sheath, of means for forming a joint between the ends of said conductors, the ends of said sheaths being spaced from said joint, a pair of dielectric sleeves surrounding the portions of said conductors between the ends of said sheaths and said joint, the adjacent ends of said sleeves having overlapping flanges surrounding said joint to provide an elongated leakage path between said sheaths and joint, said sleeves having the opposite ends thereof tapered, and metallic coverings for said tapered portions gradually flared outwardly from said insulating covering to prevent discharge between the ends of said sheaths and said joint along the surface of said insulating covering.

14. The combination with a pair of cables each comprising a conductor, an insulating covering surrounding said conductor and an outer metal sheath, of means for connecting adjacent ends of said conductors, the ends of said sheaths being spaced from the ends of said conductors, dielectric sleeves surrounding the portions of said cables between the ends of said conductors and the ends of said sheaths, the adjacent ends of said sleeves having overlapping flanges surrounding the joint between the ends of said conductors, said flanges forming pockets in the ends of said sleeves, conducting members within said pockets forming insulated flux controls, a supplementary dielectric sleeve surrounding said overlapping flanges, the ends of said first named sleeves being tapered, a metallic housing enclosing said sleeves and connected with the ends of said sheaths, and insulating compound within said housing and filling the spaces between said dielectric sleeves.

15. The combination with a pair of cables each comprising a conductor, an insulating covering and an outer metal sheath, of connectors forming a joint between the ends of said conductors, the ends of said sheaths being spaced from said joint, dielectric sleeves surrounding said cables between said sheaths and joint, said sleeves having overlapping flanges surrounding said joint, said flanges being spaced apart to provide pockets within the ends of said sleeves, the interior of said pockets being coated with conducting material and connected with said joint, a supplementary dielectric sleeve surrounding said overlapping flanges, the outer ends of said first-named sleeves being tapered, a metallic housing having tapered ends secured to said sheaths and enclosing said dielectric sleeves, said housing being divided between the ends thereof, and means for clamping the parts of said housing together, said housing having an opening therein for filling the interior thereof with an insulating fluid.

16. The combination with a cable having a dielectric covering and an outer metal sheath, of a housing member connected with the end of said sheath and spaced outwardly from said cable, a solid, integral, dielectric sleeve having a higher specific inductive capacity than said dielectric covering surrounding said cable within said housing member and extending to a point close to the end of said sheath, and a wrapping of insulating material surrounding the end of said sleeve and said cable and interposed between said cable and said housing.

In testimony whereof I have signed my name to this specification on this 30th day of July, A. D. 1926.

ARTHUR O. AUSTIN.